US012600647B2

(12) United States Patent
Nobel

(10) Patent No.: US 12,600,647 B2
(45) Date of Patent: Apr. 14, 2026

(54) WATER PURIFICATION AND METHOD FOR PURIFYING WATER

(71) Applicant: Peter Nobel, Saltsjöbade (SE)

(72) Inventor: Peter Nobel, Saltsjöbade (SE)

( * ) Notice: Subject to any disclaimer, the term of this patent is extended or adjusted under 35 U.S.C. 154(b) by 391 days.

(21) Appl. No.: 18/285,584

(22) PCT Filed: Apr. 8, 2022

(86) PCT No.: PCT/EP2022/059504
§ 371 (c)(1),
(2) Date: Oct. 4, 2023

(87) PCT Pub. No.: WO2022/214686
PCT Pub. Date: Oct. 13, 2022

(65) Prior Publication Data
US 2025/0011196 A1     Jan. 9, 2025

(30) Foreign Application Priority Data
Apr. 8, 2021     (SE) .................................... 2130097-5

(51) Int. Cl.
*C02F 1/44* (2023.01)
*B01D 61/36* (2006.01)

(52) U.S. Cl.
CPC ............ *C02F 1/447* (2013.01); *B01D 61/364* (2013.01); *B01D 61/366* (2013.01); (Continued)

(58) Field of Classification Search
CPC ................ C02F 1/447; C02F 2201/005; C02F 2301/063; C02F 2303/10; C02F 1/04; (Continued)

(56) References Cited

U.S. PATENT DOCUMENTS 5,227,027 A     7/1993   Topper
7,459,084 B2    12/2008  Baig et al.
(Continued)

FOREIGN PATENT DOCUMENTS

CN     107206322 A    9/2017
KR     101683602 B1   12/2016
(Continued)

OTHER PUBLICATIONS

International Search Report and Written Opinion mailed Jun. 17, 2022; International Patent Application No. PCT/EP2022/059504 filed on Apr. 8, 2022. ISA/EP.

*Primary Examiner* — Waqaas Ali
(74) *Attorney, Agent, or Firm* — McDonald Hopkins LLC

(57)     ABSTRACT

Water purifier (1) for purifying water, comprising a compressor circuit (50) provided with a compressor (4), a first heat exchanger (2), a second heat exchanger (7) and an expansion valve (12) arranged between the first heat exchanger (2) and the second heat exchanger (7), where the compressor circuit (50) is arranged to heat a first water circuit (51) through the first heat exchanger (2), where the compressor circuit (50) is arranged to condensate water vapour in a second water circuit (52) through the second heat exchanger (7), that the water purifier (1) further comprises a membrane module (13) having an inlet chamber (31) connected to the first water circuit (51), a membrane (30) adapted to pass water vapour through the membrane (30), and an evaporation chamber (32) connected to the second water circuit (52), where the second water circuit (52) comprises an evacuation pump (17) arranged to create an underpressure in the second water circuit (52) and in the evaporation chamber (32).

15 Claims, 1 Drawing Sheet

(52) U.S. Cl.
CPC .... *B01D 2313/18* (2013.01); *B01D 2313/221*
(2022.08); *B01D 2313/243* (2013.01); *C02F*
*2201/005* (2013.01); *C02F 2301/063*
(2013.01); *C02F 2303/10* (2013.01)

(58) Field of Classification Search
CPC ............... B01D 61/364; B01D 61/366; B01D
2313/18; B01D 2313/221; B01D
2313/243; B01D 2311/1031; B01D 53/22
See application file for complete search history.

(56)                    References Cited

U.S. PATENT DOCUMENTS

| | | | |
|---|---|---|---|
| 9,416,031 | B2 | 8/2016 | Escher et al. |
| 10,118,128 | B2 | 11/2018 | Prince et al. |
| 2004/0211726 | A1 | 10/2004 | Baig et al. |
| 2020/0330923 | A1 | 10/2020 | Johnson et al. |

FOREIGN PATENT DOCUMENTS

| | | | | | |
|---|---|---|---|---|---|
| RU | 2723858 | C1 | 6/2020 | | |
| WO | WO-2013157776 | A1 * | 10/2013 | ........... | B01D 61/364 |
| WO | 2017214111 | A1 | 12/2017 | | |

\* cited by examiner

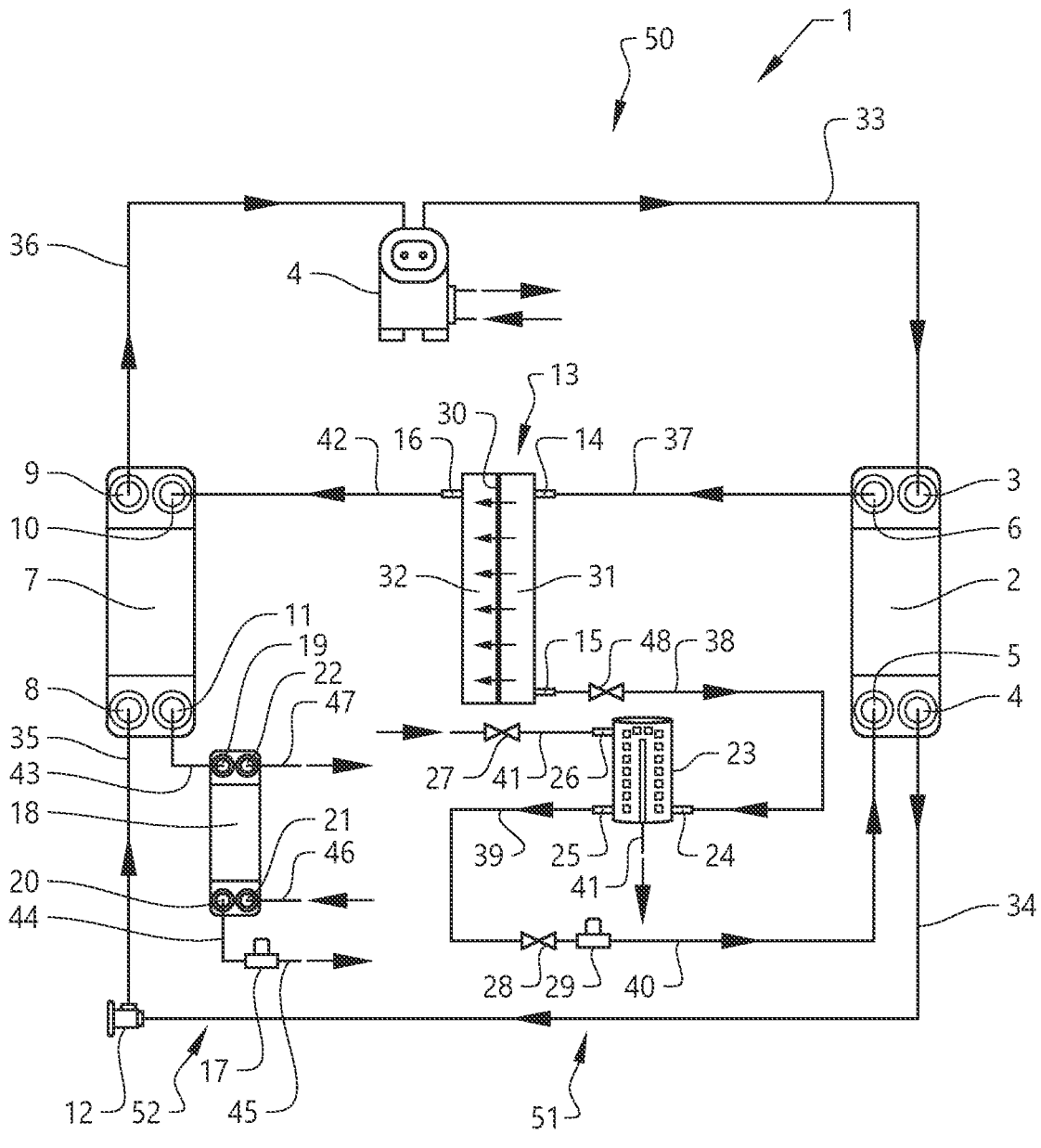

WATER PURIFICATION AND METHOD FOR PURIFYING WATER

CROSS-REFERENCE TO RELATED APPLICATION

This application is a 35 U.S.C. 371 national stage filing of PCT Application No. PCT/EP2022/059504, filed on Apr. 8, 2022, which claims the benefit of Swedish Patent Application No. 2130097-5, filed on Apr. 8, 2021, both of which are incorporated herein in their entirety by reference.

TECHNICAL FIELD

The present invention relates to an arrangement and a method for water purification. The inventive arrangement and method is suitable for purifying water containing different solvable substances, such as polluted fresh water, salt water or tap water.

BACKGROUND ART

There are several different techniques known to purify unclean water containing different substances in the water, or to desalinate salt water. Depending on the type of contained substance, one or more techniques may be used either alone or in combination. When treating unclean water comprising particles suspended in the water, e.g. in a sewage system, the system may comprise different mechanical filter types, one or more biological processing steps and one or more chemical processing steps.

In a sewage system, contaminants are removed from wastewater and household sewage, both effluents and domestic. It includes physical, chemical, and biological processes to remove physical, chemical and biological contaminants. The main purpose is to produce an environmentally-safe fluid waste stream with more or less clean water that can be discharged in nature, e.g. in a river, see or lake, and a solid waste in the form of sludge that can be disposed of or reused.

The wastewater of the sewage system may be more or less clean. When undesirable chemicals, materials, and biological contaminants have been removed from contaminated water, the water is defined as purified and can be used for a specific purpose, e.g. as drinking water or other purposes, including meeting the requirements of medical, pharmacology, chemical and industrial applications. In general, the methods used to purify water include physical processes such as filtration and sedimentation, biological processes such as slow sand filters or active sludge and chemical processes such as flocculation and chlorination.

One way to purify water is to use membrane distillation. There are several well-known different membrane techniques. In such systems, water vapour is forced through a membrane followed by a subsequent condensation of the vapour. The membrane type used is normally hydrophobic, which only allows water vapour molecules to pass through the membrane but stops fluid water and other types of contaminants to pass through the membrane. After the water vapour has condensed to condensate, the result is that only pure water will be present on the other side of the membrane.

Various membrane distillation techniques require high amounts of energy and have in general low throughput levels (flux, litres of purified water/square meter membrane and hour). Their designs in facilitating the needed heating and cooling arrangements also leads to complexity in applications and to a high number of required components.

WO 9915463 A1 discloses an apparatus for obtaining pure water from crude water that includes an evaporator arrangement that has a first circuit for circulating crude water, a second circuit for circulating liquid coolant, and membrane elements for separating the circulating crude water from the circulating liquid coolant and for obtaining pure water from the crude water by means of membrane distillation through the medium of the membrane elements. This apparatus increases the energy efficiency, but still has a low output rate of purified water.

Such a membrane distillation system works fine when it comes to purify water. However, known systems have a low throughput, requires high energy consumption and are complicated and relatively large. There is thus a need for an improved water purifier.

DISCLOSURE OF INVENTION

An object of the invention is therefore to provide an improved water purifier. A further object of the invention is to provide an improved method for purifying water.

The solution to the problem according to the invention is described in the characterizing part of claim 1. An inventive method for purifying water is described in claim 12. The other claims contain advantageous further developments of the inventive arrangement and method.

In a water purifier for purifying water, comprising a compressor circuit provided with a compressor, a first heat exchanger, a second heat exchanger and an expansion valve arranged between the first heat exchanger and the second heat exchanger, where the compressor circuit is arranged to heat a first water circuit through the first heat exchanger, the object of the invention is achieved in that the compressor circuit is arranged to condensate water vapour in a second water circuit through the second heat exchanger, that the water purifier further comprises a membrane module having an inlet chamber connected to the first water circuit, a membrane adapted to pass water vapour through the membrane, and an evaporation chamber connected to the second water circuit, where the second water circuit comprises an evacuation pump arranged to create an underpressure in the evaporation chamber located in the second water circuit.

By this first embodiment of the water purifier according to the invention, a water purifier with a reduced complexity, a reduced footprint and a reduced energy consumption is obtained. The water purifier can be used for water containing different solvable substances or for salt water and is mainly intended for water having a low degree of particles and a low concentration of particles. The water purifier is suitable for purifying fresh water and for desalinating salt water. In the water purifier, the heat energy used to heat the water in the first water circuit is recovered from the water vapour in the second water circuit. This increases the efficiency of the water purifier.

In an advantageous development of the inventive water purifier, the water purifier is further provided with an additional sub-cooler that may cool the purified water to a lower temperature, such that no additional water cooler is required in a subsequent process step.

In an advantageous development of the inventive water purifier, the water purifier comprises a plurality of membrane modules arranged side by side. This will increase the water purification capacity of the system and will allow the capacity of the water purifier to be adapted to the requirements. In order to preserve the efficiency of the water purifier, it is important that the water flow through a membrane module is not too low. By using several membrane modules in parallel, one or more membrane modules can be shut off when the needed capacity is lower, keeping the water flow through the remaining membrane module within limits.

In an advantageous development of the inventive water purifier, the membrane module comprises a plurality of membranes arranged side by side, with common inlet and outlet openings. This will resemble a plate heat exchanger and will increase the water purification capacity of the system. The membranes are arranged side by side, creating adjacent channels for input water and water vapour. The membrane module may be made from a plastic material, where each membrane plate is injection moulded and comprises a distribution pattern. This will increase the water distribution in the water channels.

The inventive method provides a simple, cost-effective and compact water purification method. Further, no additional chemical additives are needed for the purifying process.

BRIEF DESCRIPTION OF DRAWINGS

The invention will be described in greater detail in the following, with reference to the attached drawings, in which FIG. 1 shows a schematic view of a water purifier according to the invention.

MODES FOR CARRYING OUT THE INVENTION

The embodiments of the invention with further developments described in the following are to be regarded only as examples and are in no way to limit the scope of the protection provided by the patent claims. The given numbers for e.g. temperatures, pressures and mechanical dimensions are only given as examples and may vary depending on the selected design.

FIG. 1 shows a view of a water purifier 1 according to the invention. The water purifier is adapted to purify water without the need of additional additives or further processes. The water may be e.g. contaminated fresh water or salt water. The water may come from different sources and may include e.g. industrial, agricultural or hospital wastewater, as long as the amount of contained particles are low. The water may be raw water, leachate water from waste disposal sites, wastewater from fish breeding in both fresh water and salt water, or other process water. The water purifier is e.g. well suited to remove solvable substances such as traces of different drugs, radon or cadmium in the wastewater. The water purifier is also suitable to purify tap water that contains e.g. bacteria or other substances that makes the tap water unsuitable to drink. The size and capacity of the water purifier can be adapted to the requirements.

The water purifier 1 comprises a compressor circuit 50, a first water circuit 51 and a second water circuit 52. The compressor circuit comprises a compressor 4, a first channel in a first heat exchanger 2, an expansion valve 12, and a first channel in a second heat exchanger 7 interconnected with conduits and providing a closed refrigerant system. The compressor circuit is filled with a refrigerant that is compressed and decompressed in the compressor circuit. The refrigerant may be e.g. ammonia, carbon dioxide, ethylene, ethane, propylene, propane or a chlorofluorohydrocarbon.

The compressor circuit comprises a compressor 4 that compresses the refrigerant to a relatively high temperature, e.g. in the range between 70-90° C. depending on the compressor and the selected refrigerant. The compressor is in the shown example powered by electricity, but can also be driven by any other rotational force such as a combustion engine. The compressor circuit may also comprise an adiabatic process in which the refrigerant is circulated by a chemical process instead of a compressor. In normal operation, the compressor is air-cooled but is possible to supply the compressor with an additional cooler if required.

The heated and pressurized refrigerant is fed through a first conduit 33 to the first heat exchanger 2 and enters a first channel of the first heat exchanger through a first inlet 3. The heat exchanger is preferably a plate heat exchanger, but other types are also possible to use. The refrigerant heats the water of a first water circuit 51 flowing in a second channel in the first heat exchanger. The refrigerant leaves the first channel of the first heat exchanger through a first outlet 4 and enters a second conduit 34, having a slightly lower temperature. The second conduit is connected to an expansion valve 12 in which the pressurized refrigerant is decompressed to a lower pressure, which at the same time lowers the temperature of the refrigerant considerably. After the expansion valve, the temperature of the refrigerant may be in the range between 0-20° C. depending on the selected refrigerant.

The decompressed refrigerant passes through a third conduit 35 to a first inlet 8 of a first channel of a second heat exchanger 7. In the first channel, the refrigerant will evaporate by the heat from the water vapour in the second channel. At the same time, the water vapour of the second water circuit 52 condenses to water in the second channel in the second heat exchanger by the refrigerant in the first channel. The refrigerant leaves the second channel of the second heat exchanger as gas through a first outlet 9 and enters a fourth conduit 36. The refrigerant returns through the fourth conduit to the compressor 4, where it is compressed again.

The water that is to be purified is contained in the first water circuit 51. The first water circuit 51 comprises a second channel in the first heat exchanger 2, an inlet chamber 31 in the membrane module 13, a reservoir 23 holding a supply of water, an inlet valve 28 and an inlet pump 29 interconnected with conduits. The water enters the second channel in the first heat exchanger 2 through a second inlet 5 and is heated in the second channel by the refrigerant in the first channel of the first heat exchanger. The heated water exits the second channel through a second outlet 6 of the first heat exchanger and continues through a fifth conduit 37 to the inlet chamber 31 of the membrane module 13 through a first inlet 14 of the membrane module.

The membrane module 13 comprises in one example a rectangular membrane provided with support members. The membrane module may also have other shapes and designs, and may e.g. comprise a circular membrane. It is also possible to place several membranes in a parallel arrangement in the same housing. In the inlet chamber of the membrane module, the water is distributed evenly over the entire membrane surface, e.g. by ridges arranged in the inlet chamber, either on the rear side of the inlet chamber or on the plate holding the membrane 30. This is important in order to preserve the efficiency of the water purifier. In the inlet chamber, part of the water evaporates and passes through the membrane 30 to an evaporation chamber 32 of the membrane module, and at the same time, the water loses some of its heat. The membrane may be hydrophobic and will only allow water vapour to pass through. After the inlet chamber, the remaining water exits the membrane module through a first outlet 15 of the membrane module to a sixth conduit 38. It is possible to provide the first outlet 15 with a controllable reduction valve 48 in order to control the flow through the inlet chamber, if necessary. The sixth conduit is connected to the reservoir 23 via a first inlet 24 of the reservoir, through which the water circulates and mixes with the rest of the water.

Since part of the water is transformed to water vapour in the evaporation chamber 32, the water in the reservoir is constantly or batchwise replenished with additional water, e.g. contaminated fresh water or salt water, through a first inlet valve 27, a ninth conduit 41 and a second inlet 26 of the reservoir in a corresponding amount to what is extracted from the system as purified water In the reservoir, the concentration of solvable substances will rise when the water is purified. This higher concentration causes the solvable substances to form solid salt particles, which sinks to the bottom of the reservoir. The salt particles can be removed from the reservoir, e.g. through a ninth conduit 41 arranged at the bottom of the reservoir. The water exits the reservoir through a first outlet 25 of the reservoir to a seventh conduit 39 that is connected to a second inlet valve 28 and an inlet pump 29. The inlet pump creates the pressure and the flow for the water to the second channel of the first heat exchanger and the inlet chamber of the membrane module. The water passes from the inlet pump to the second inlet 5 of the first heat exchanger 2 through an eight conduit 40.

The pressure in the first water circuit 51 created by the inlet pump 29 is not very high, and the purpose of the inlet pump is more to create a flow through the first water circuit than to create a high pressure. The pressure may e.g. be around 1 bar. The temperature of the water entering the inlet chamber of the membrane module is preferably in the range between 60-80° C. and the temperature drop in the inlet chamber may be around 5° C.

After the reservoir 23, the water temperature is even lower, and is heated to the required temperature in the second channel in the first heat exchanger 2 by the refrigerant. In the membrane module, between 1-2% of the water is transformed to water vapour that enters the evaporation chamber 32 of the membrane module. The capacity of the water purifier is in one example higher than 20 litres per square meter and hour.

The water vapour condensates to purified water in the second water circuit 52. The second water circuit 52 comprises an evaporation chamber 32 in the membrane module 13, a second channel in the second heat exchanger 7 and an evacuation pump 17 interconnected with conduits. The water vapour enters the evaporation chamber through the membrane 30 of the membrane module. The water vapour exits the evaporation chamber through a second outlet 16 of the membrane module and a tenth conduit 42 to the second channel of the second heat exchanger 7 through a second inlet 10 of the second heat exchanger 7. The temperature of the water vapour is in one example around 70° C. In the second channel of the heat exchanger, the water vapour condensates to water and flows out of the second channel through a second outlet 11 of the second heat exchanger. In the second channel, the water vapour evaporates the refrigerant of the first channel. At the same time, the water vapour condenses to water in the second channel. From the second outlet 11 of the second heat exchanger, the purified water flows through an eleventh conduit 43 to the evacuation pump 17, which drains the purified water of the second water circuit 52 through a thirteenth conduit 45. The water that is drained by the evacuation pump is now completely purified and further cooled, and can e.g. be used as drinking water or for other purposes.

The water vapour created in the membrane module 13 is created by the heat difference between the inlet chamber 31 and the evaporation chamber 32. The higher temperature in the inlet chamber is created by the heated water in the first water circuit 51. The lower temperature in the evaporation chamber is created by the evacuation pump 17, which lowers the pressure by creating an underpressure in the second water circuit 52 and thus in the evaporation chamber 32. The underpressure in the second water circuit 52 is preferably in the range between 0.9-0.1 bar.

The pressure in the evaporation chamber 32 is lowered by the evacuation pump 17 from the normal atmospheric pressure to an underpressure, e.g. from slightly under 1 bar down to 0.2 bar. This causes the water vapour in the evaporation chamber 32 to be transported from the membrane surface in the evaporation chamber 32 to the second heat exchanger, acting as a separate evaporator, where the water vapour will evaporate the refrigerant in the first channel. The water vapour will at the same time condensate to condensed water. The second heat exchanger acts in the shown example as a separate evaporator and is a plate heat exchanger, but other heat exchangers are of course also possible. The temperature gradient between the two sides of the membrane 30 may be around 5° C. or more. Due to the lower pressure, the water vapour does not condensate in the evaporation chamber even if the temperature in the evaporation chamber may be between e.g. 60-70° C. The water vapour condensates in the second channel in the second heat exchanger 7, and is at the same time cooled down further, e.g. to a temperature of between e.g. 10-30° C.

The second water circuit 52 may also comprise an additional cooler function in the form of a third heat exchanger 18, which can be used to lower the temperature of the purified water to an even lower temperature, e.g. to a temperature between e.g. 5-10° C. such that it can be used directly as household water. In this example, the third heat exchanger 18 is connected to the eleventh conduit 43 by a first inlet 19 of the third heat exchanger. The purified water passes a first channel in the third heat exchanger and exits through a first outlet 20 of the third heat exchanger and a twelfth conduit 44 to the evacuation pump 17. External cooling water flows through a fourteenth conduit 46 to a second inlet of the third heat exchanger, though a second channel of the third heat exchanger and exits through a second outlet 22 of the third heat exchanger to a fifteenth conduit 47.

The inventive water purifier can be made relatively compact and with relatively fewer components when compared to existing membrane distillation systems. Since the water purifier only contains one compressor circuit for both heating and cooling instead of a separate heating circuit and a separate cooling circuit, the amount of required components is reduced significantly. This allows for a compact water purifier. Further, the heat produced by the compressor to heat the water in the first water circuit is recovered in the second heat exchanger by the evaporation of the refrigerant. In this way, the water purifier is very energy efficient.

The compressor circuit of the water purifier is a closed system, where the water vapour is transferred to a separate evaporator, which makes the water purifier suitable for low-gravity and zero-gravity environments. The water purifier could also be used to dehumidify air in environments having a lower pressure, such as airplane cabins.

The invention is not to be regarded as being limited to the embodiments described above, a number of additional variants and modifications being possible within the scope of the subsequent patent claims.

REFERENCE SIGNS

1: Water purifier
2: First heat exchanger
3: First inlet
4: First outlet
5: Second inlet
6: Second outlet
7: Second heat exchanger
8: First inlet
9: First outlet
10: Second inlet
11: Second outlet
12: Expansion valve
13: Membrane module
14: First inlet
15: First outlet
16: Second outlet
17: Evacuation pump
18: Third heat exchanger
19: First inlet
20: First outlet
21: Second inlet
22: Second outlet
23: Reservoir
24: First inlet
25: First outlet
26: Second inlet
27: First inlet valve
28: Second inlet valve
29: Inlet pump
30: Membrane
31: Inlet chamber
32: Evaporation chamber
33: First conduit
34: Second conduit
35: Third conduit
36: Fourth conduit
37: Fifth conduit
38: Sixth conduit
39: Seventh conduit
40: Eighth conduit
41: Ninth conduit
42: Tenth conduit
43: Eleventh conduit
44: Twelfth conduit
45: Thirteenth conduit
46: Fourteenth conduit
47: Fifteenth conduit
48: Reduction valve
50: Compressor circuit
51: First water circuit
52: Second water circuit

The invention claimed is:

1. A water purifier for purifying water, comprising a compressor circuit provided with a compressor, a first heat exchanger, a second heat exchanger and an expansion valve arranged between the first heat exchanger and the second heat exchanger, where the compressor circuit is arranged to heat a first water circuit through the first heat exchanger, wherein the compressor circuit is arranged to condensate water vapour in a second water circuit through the second heat exchanger, that the water purifier further comprises a membrane module having an inlet chamber connected to the first water circuit, a membrane adapted to pass water vapour through the membrane, and an evaporation chamber connected to the second water circuit, where the second water circuit comprises an evacuation pump arranged to create an underpressure in the evaporation chamber located in the second water circuit.

2. The water purifier according to claim 1, wherein the evacuation pump is adapted to transport the water vapour from the evaporation chamber to the second heat exchanger, where the second heat exchanger is adapted to condensate the water vapour.

3. The water purifier according to claim 1, wherein the evacuation pump is adapted to create a pressure in the second water circuit that is in a range between 0.9-0.1 bar.

4. The water purifier according to claim 1, wherein the first heat exchanger is adapted to heat the first water circuit to a temperature in a range between 60 to 80° C.

5. The water purifier according to claim 1, wherein the water purifier comprises a plurality of membrane modules arranged in parallel.

6. The water purifier according to claim 1, wherein the membrane module comprises a plurality of membranes arranged side by side.

7. The water purifier according to claim 6, wherein the membranes are provided with a common inlet and a common outlet for the inlet chamber, and a common outlet for the evaporation chamber.

8. The water purifier according to claim 1, wherein the membrane module is made from a plastic material.

9. The water purifier according to claim 1, wherein the second water circuit comprises an additional heat exchanger arranged to cool the purified water.

10. The water purifier according to claim 1, wherein an outlet of the inlet chamber is provided with a controllable reduction valve.

11. The water purifier according to claim 1, wherein the compressor is an electric compressor.

12. A method for purifying water, comprising the steps of:
running a compressed refrigerant of a compressor circuit through a first heat exchanger,
heating a first water circuit with the first heat exchanger,
forwarding the heated water of the first water circuit to an inlet chamber of a membrane module,
running the refrigerant through an expansion valve,
running an expanded refrigerant through a second heat exchanger,
creating an underpressure in a second water circuit with an evacuation pump, thereby creating an underpressure in an evaporation chamber of the membrane module, such that water vapour passes through a membrane from the heated inlet chamber to the low pressure evaporation chamber of the membrane module,
condensing the water vapour with the second heat exchanger in the second water circuit,
draining purified water out of the second water circuit through the evacuation pump.

13. The method according to claim 12, wherein the water vapour is transported from the evaporation chamber to the second heat exchanger by the evacuation pump.

14. The method according to claim 12, wherein the underpressure created by the evacuation pump in a range between 0.9-0.1 bar.

15. The method according to any of claim 12, wherein the first water circuit is heated to a temperature in a range between 60 to 80° C.

* * * * *